Sept. 26, 1967  C. W. HOWE  3,343,695
BLOCK LOADING AND UNLOADING APPARATUS
Filed April 12, 1965  5 Sheets-Sheet 1
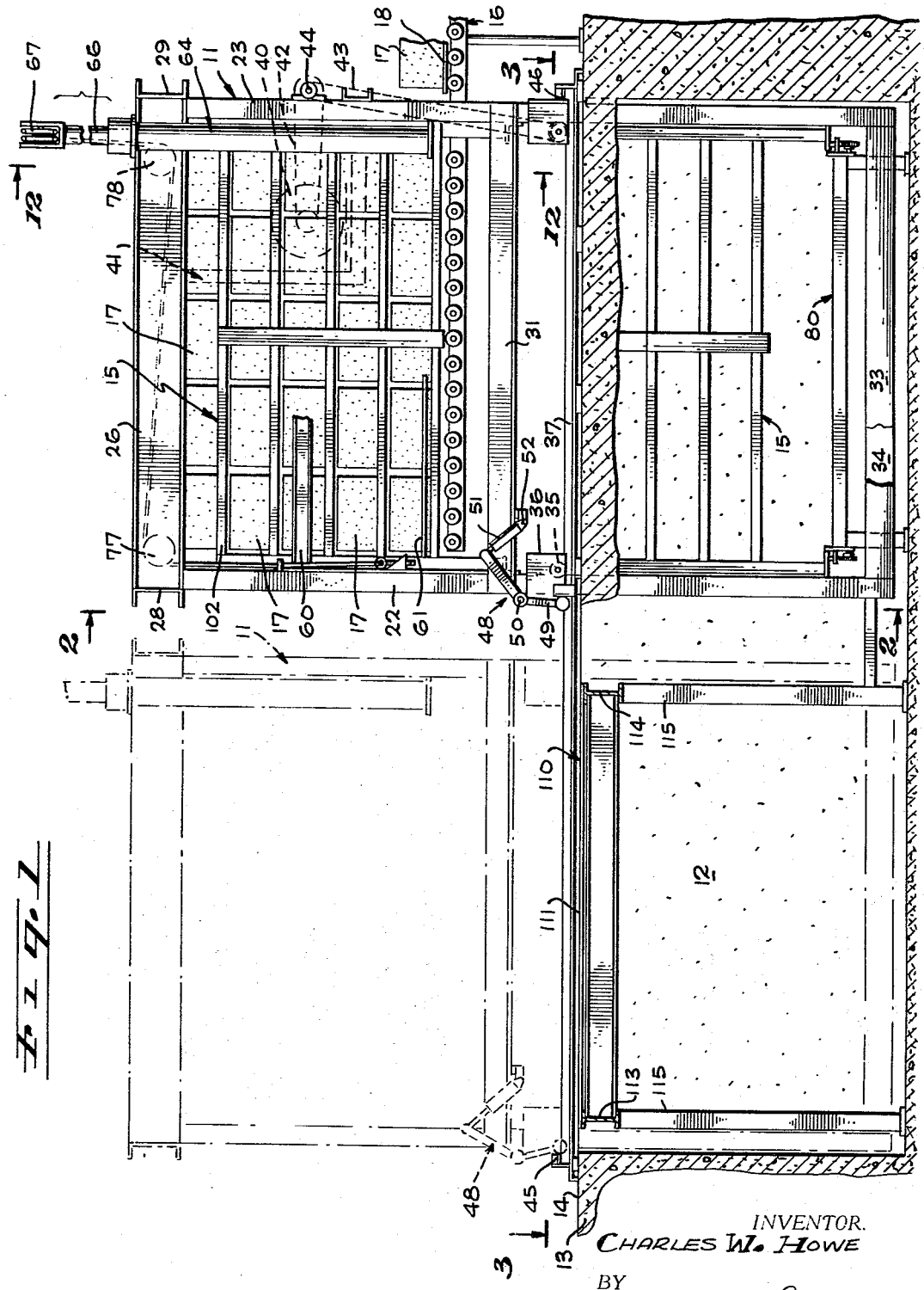
INVENTOR.
CHARLES W. HOWE
BY
Marsen & Graham
ATTORNEYS

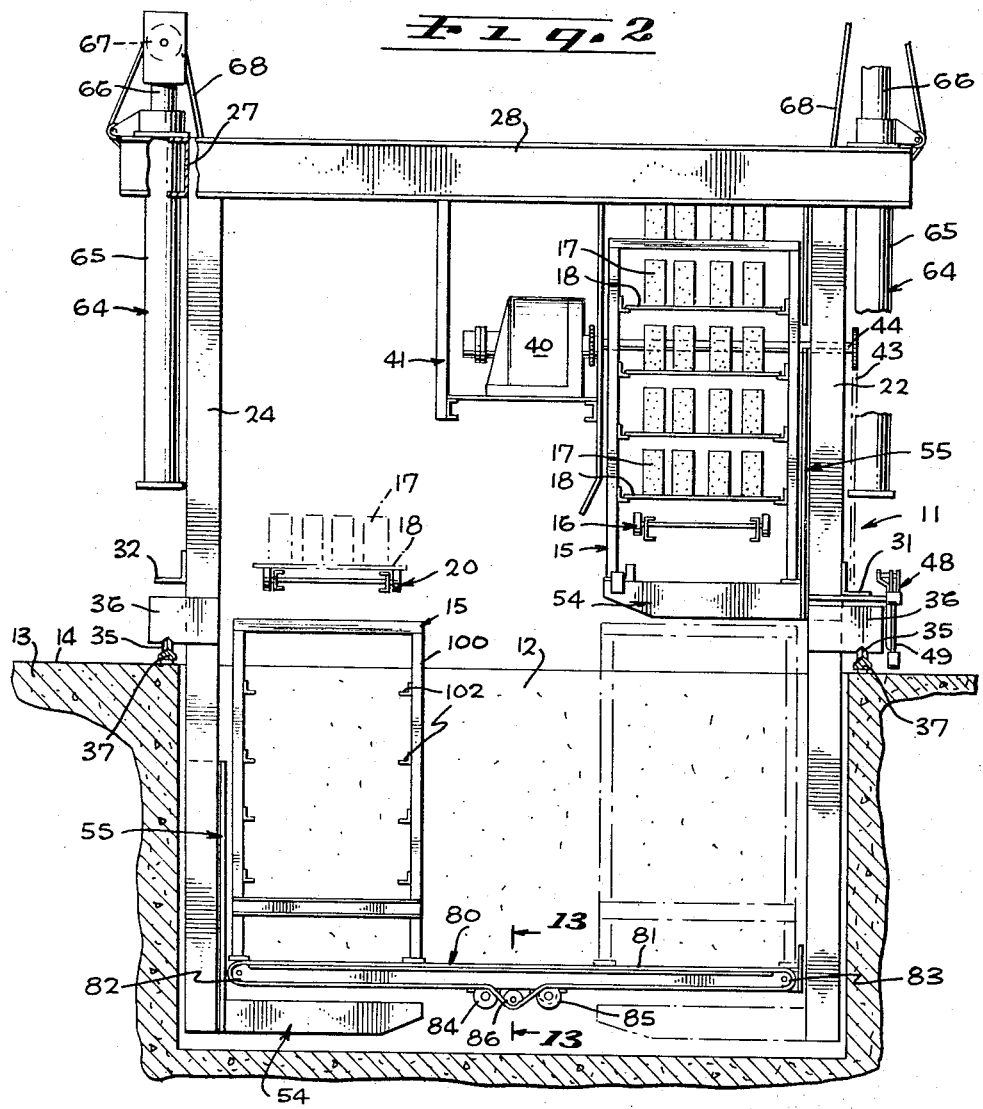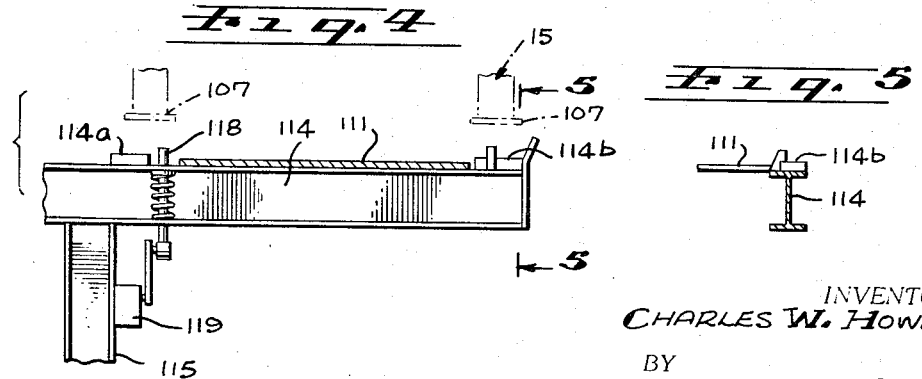

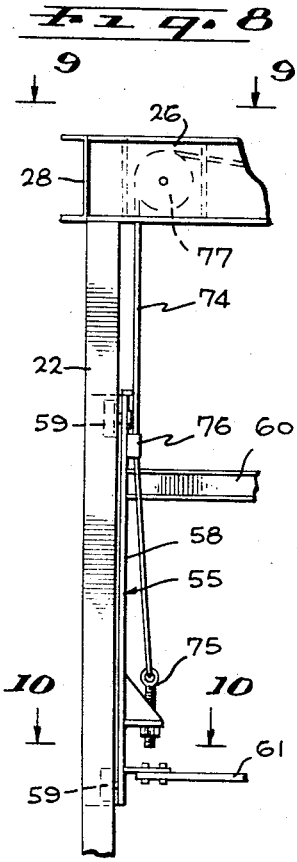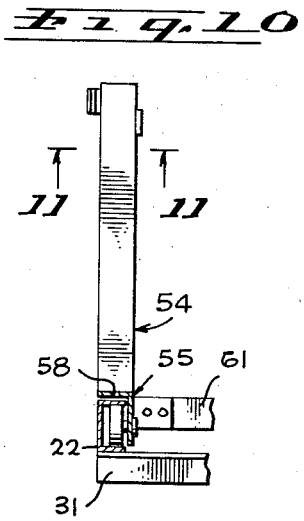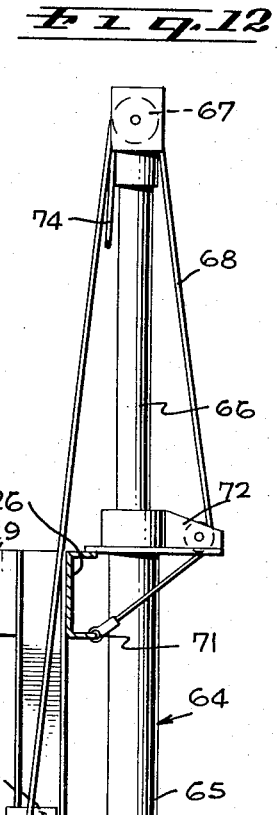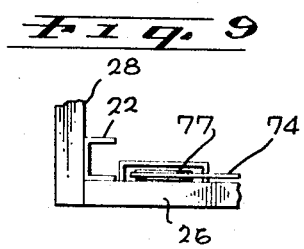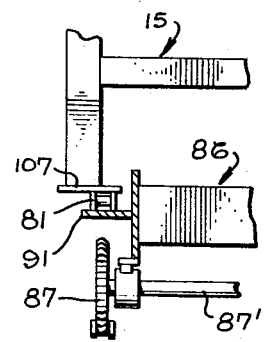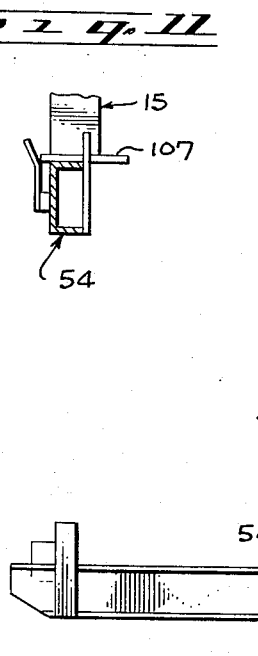

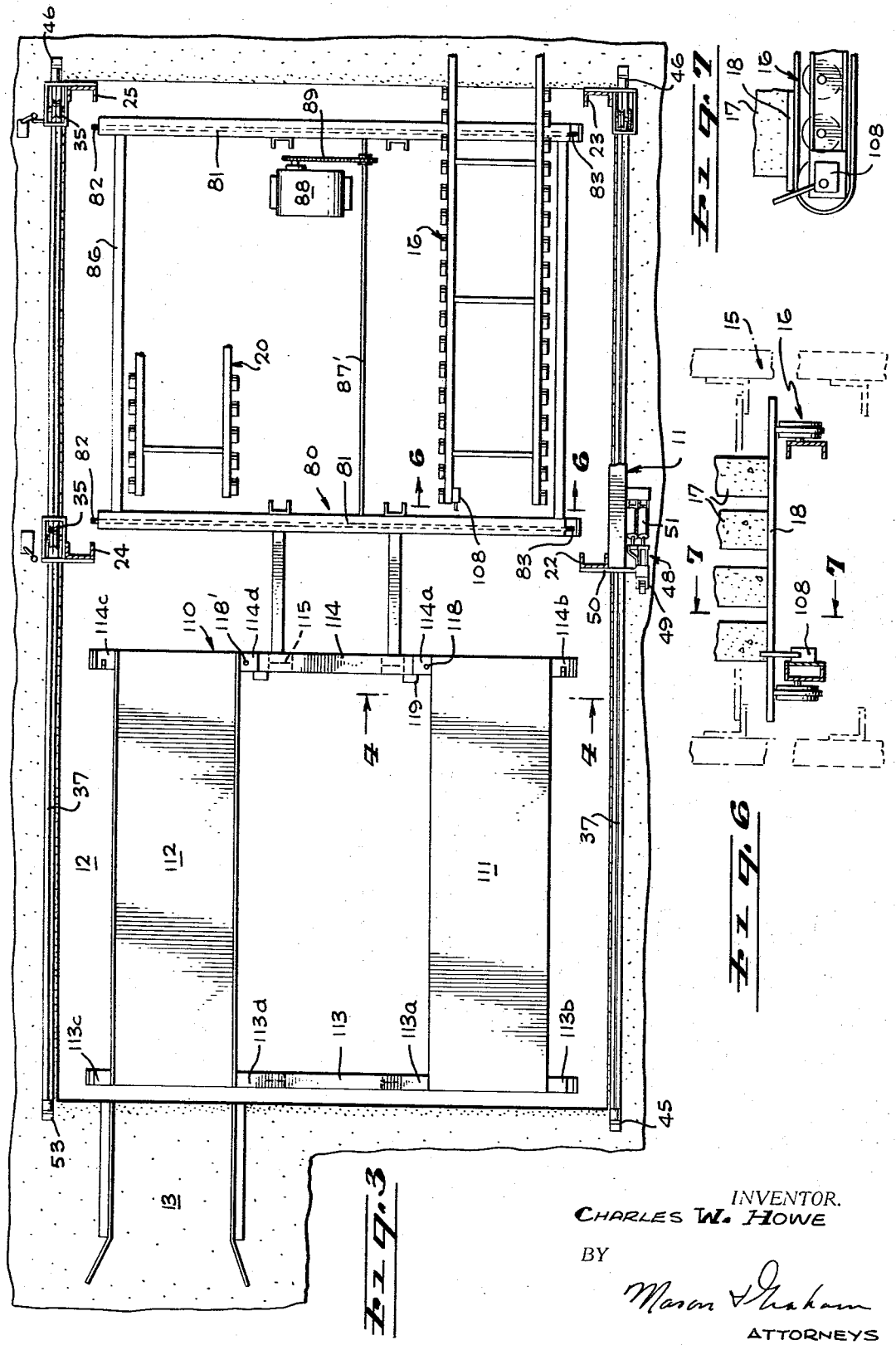

Sept. 26, 1967  C. W. HOWE  3,343,695
BLOCK LOADING AND UNLOADING APPARATUS
Filed April 12, 1965  5 Sheets-Sheet 5

INVENTOR.
CHARLES W. HOWE
BY
Mason & Graham
ATTORNEYS

United States Patent Office 3,343,695
Patented Sept. 26, 1967

3,343,695
BLOCK LOADING AND UNLOADING
APPARATUS
Charles W. Howe, 27265 Santa Charita Ave.,
Saugus, Calif. 91350
Filed Apr. 12, 1965, Ser. No. 447,467
8 Claims. (Cl. 214—164)

ABSTRACT OF THE DISCLOSURE

The application discloses a rack for receiving concrete blocks discharged from a block-making machine and a motorized cage structure adapted to hold such racks and manipulate the same into various positions whereby to receive blocks from the machine, permit removal of the loaded racks and receive loaded racks for unloading blocks therefrom.

This invention has to do with apparatus for handling concrete blocks or similar objects as they are discharged from a block-making machine or other source in a manner to load them onto easily handled racks, and also in a manner to permit the unloading or removal of the blocks from the racks.

An object of the invention is to provide a novel, relatively simple apparatus designed to receive concrete blocks or the like as they are discharged from the block-making machine, and arrange or stack the blocks on a rack for removal thereof to a curing area, and also designed to receive cured or semi-cured blocks on such a rack returned from the curing area and unload the blocks from the racks for shipment or storage on pallets or other means.

Another object is to provide a novel block handling apparatus of the general type indicated in which movement of the blocks is kept at a minimum, and in which the blocks are moved longitudinally and vertically without any lateral or turning movement thereof, thereby safeguarding the blocks from damage and raising the over-all quality of production. Also in this connection it is an object to provide apparatus in which no appreciable shock loads are imposed on the blocks.

Still another object is to provide apparatus which employs a novel block holding rack which can be handled by either a fork lift or platform lift truck.

Another object is to provide appartus which can be used to load or unload conventional autoclave racks with added capacity.

A further object is to provide apparatus which has relatively few moving parts and which is easy to construct and to maintain.

These and other objects will be apparent from the drawings and the following description. Referring to the drawings:

FIG. 1 is a sectional elevational view showing apparatus embodying the invention;

FIG. 2 is a cross sectional view on line 2—2 of FIG. 1;

FIG. 3 is a sectional plan view on line 3—3 of FIG. 1;

FIG. 4 is a fragmentary cross sectional view on line 4—4 of FIG. 3, but on a larger scale;

FIG. 5 is a fragmentary sectional view on line 5—5 of FIG. 4;

FIG. 6 is a fragmentary cross sectional view on line 6—6 of FIG. 3, but on a larger scale;

FIG. 7 is a fragmentary elevational view of the end of one of the conveyors on line 7—7 of FIG. 6;

FIG. 8 is a fragmentary elevational view of the left corner post and associated structure of the cage of FIG. 1, but on a larger scale;

FIG. 9 is a fragmentary plan view on line 9—9 of FIG. 8;

FIG. 10 is a fragmentary sectional view on line 10—10 of FIG. 8;

FIG. 11 is a fragmentary sectional view on line 11—11 of FIG. 10;

FIG. 12 is a fragmentary sectional elevational view on line 12—12 of FIG. 1, but on a larger scale;

FIG. 13 is a fragmentary cross sectional view on line 13—13 of FIG. 2, but on a large scale;

Figure 14:
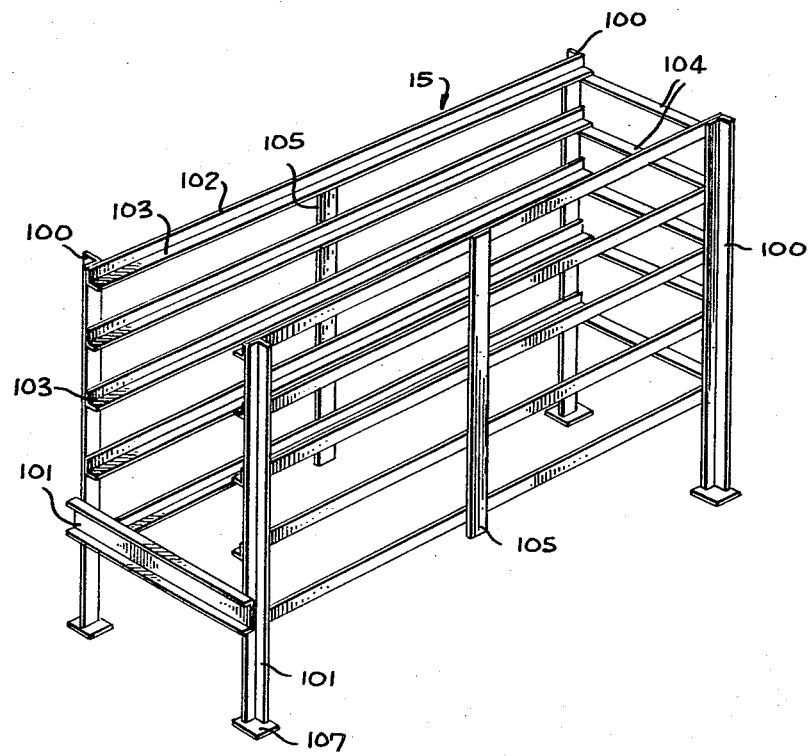
FIG. 14 is an isometric view of a rack.

More particularly describing the invention, in general the apparatus includes a cage 11 which is shown mounted for limited horizontal movement from a first position in which it is shown to a second position as shown in broken lines in FIG. 1. The cage extends into a cellar or pit 12 in the surrounding ground or foundation 13 and also extends above the surface 14 of the ground. The cage is adapted to receive and support a pair of racks 15 in laterally spaced relation and includes means for elevating and lowering the racks independently of each other. The apparatus is shown in conjunction with a conveyor 16 which delivers concrete blocks 17 (or other articles) supported on pallets 18 to one of the racks 15 in the cage. Also associated with the cage is a second conveyor, designated 20, which is designed to remove blocks from the other rack. The conveyor 16 may lead from any source of blocks, such as a machine for making concrete blocks (not shown) and, in the usual or ordinary use of the invention, it is contemplated that the blocks on the conveyor 16 will be uncured and hence fragile.

The cage comprises a frame including four upright corner posts 22, 23, 24 and 25, an upper rectangular frame comprising members 26, 27, 28 and 29 connecting the posts, intermediate side rails 31 and 32, and bottom side rails 33 and 34. The cage is provided with a grooved wheel 35 outboard of each corner post on a bracket 36. The rollers ride on a pair of rails 37.

For the purpose of moving the cage from the full-line position of FIG. 1 to the broken-line position thereof, I provide a motor 40 on a subframe 41 of the cage. The motor is operatively connected to two of the supporting rollers 35 by chain drives 42, 43, a countershaft 44 and suitable sprockets (not numbered) over which the chains pass. Stops 45 and 46 at the ends of the rails 37 are provided to limit travel of the cage. To cushion the stopping of the cage, I provide a shock absorber assembly 48 which includes a bell crank 49 pivoted at 50. This is pivotally connected at one end to a piston-cylinder-type shock absorber 51. The latter is pivoted on the frame at 52. The free end of lever 49 strikes abutments 45 and 53 as the cage approaches the limit of its travel in the two directions, respectively.

The cage is provided with two vertically movable rack supports at each side and in each case these comprise two arms or tines 54 which extend horizontally inwardly of the cage from carriages 55, respectively. The carriages are movable vertically on the corner posts of the cage, respectively. Each carriage comprises an elongated channel body 58 with rollers 59 at its ends. The two carriages on a side are connected by a channel member 60 and a plate 61. Any suitable means may be provided for raising and lowering the carriages on the posts so that the two carriages on a side can be operated in unison and independently of the other two carriages. By way of illustration, I show the carriages operated by hydraulic ram assemblies 64 (FIG. 12). Each of these includes a stationary cylinder 65 and a piston rod 66 extending vertically from the cylinder provided with a pair of sheaves 67 at its upper end. A line or cable 68 extends from the nearest carriage around one of the sheaves 67, the cable being secured to an adjustable eyebolt 69 on the carriage, passing through a guide 70 thereon, and being secured at its other end to the cage frame at 71. A bracket 72 serves to hold the cable outwardly of cylinder 66. A second line or cable, designated 74, is attached at one end to an adjustable eyebolt 75 on the far carriage. This cable passes through a guide 76, around idler sheaves 77 and 78 on the frame and then around the other of the two sheaves 67 at the upper end of piston rod 66. Cable 74 then passes through bracket 72 and has its end (not shown) attached to the frame on the far side of the cylinder 66 (as viewed in FIG. 12) in the same manner as the corresponding end of cable 68. The cables are adjusted so that the two carriages on a side are disposed at the same elevation and operate together.

Each rack 15 stands on and is supported upon the two arms 54 at one side of the cage, and it will be apparent that the racks may be raised and lowered independently of each other.

In the pit or cellar 12 I provide a conveyor 80 for the purpose of transferring empty racks from one side of the cellar to the other. This conveyor includes a pair of endless chains 81 in parallel laterally spaced relation. These are trained around sprockets 82, 83, 84 and 85, carried by a framework 86, and driven by sprockets 87. The latter are fixed to a drive shaft 87′ which is driven by an electric motor 88 by means of a chain drive 89. The upper run of each conveyor chain rests upon a shelf 91 (FIG. 12) that projects outwardly of framework 86. Thus the upper run is fully supported intermediate its ends and can readily carry the weight of a rack 15 resting thereon, as fragmentarily shown in FIG. 12.

In FIG. 14 I show a preferred form of rack 15. This includes a metal frame made up of four corner posts 100, end rails 101 and a plurality of pallet supporting angle members 102 forming ledges 103. The members 102 extend longitudinally of the rack in vertically spaced relation with the members on one side level with those on the other side. Tie rods 104 extend between the posts at the ends. Also, two side supports 105 connect members 102. Footplates 107 are provided at the lower ends of the posts.

In the pit 12 I provide a frame structure 110 which includes tables or plates 111 and 112 disposed at ground level in laterally spaced relation and extending between two cross beams 113 and 114. The latter are in turn supported upon vertical posts 115. In the contemplated use of the apparatus a loaded rack 15 is deposited by the cage in position overlying the table 111. The rack doesn't rest upon the table but rather stands upon the cross beams 113 and 114 in the areas thereof immediately outboard of the table 111, namely, areas 113a, 113b, 114a and 114b. In the cross beam 114 I provide an upwardly projecting spring-biased pin 118 which is depressed when the rack 15 is placed on the beams. The pin actuates a switch 119 and thereby provides a means of detecting the presence of the rack. Normally, prior to the movement of the cage from the full-line position of FIG. 1 to the broken-line position thereof, a rack 15 containing semicured blocks (or an empty rack) is placed in position overlying the table 112 with its footplates resting upon the portions 114c, 114d, 113c and 113d outboard of the table 112. This may be done by a special fork lift truck or other equipment or any other extraneous means. In this connection it should be pointed out that the footplates 107 of the racks are so sized and located that, when a rack is placed on the beams 113 and 114, the footplates extend longitudinally of the rack beyond the beams. This enables the arms 54, which are spaced apart slightly more than the beams 113 and 114, to pick up and deposit the racks on the beams. Beam 114 has a second spring-biased pin, designated 118′, operating a switch (not shown) which is actuated by a rack resting on areas 113c, 113d, 114c and 114d.

In the operation of the apparatus as contemplated, concrete blocks 17 or other objects are delivered by means of the conveyor 16 to a rack 15 supported in the cage on the arms 54 of the near side of the cage as viewed in FIG. 1. Normally several blocks rest upon a pallet 120, and the pallets are moved into position just above a pair of ledges 103 where several can be picked up by the rack as it rises. When one level of the rack has been filled (preferably the uppermost one is filled first) the rack is raised and the next level filled. During this operation partially cured blocks may be removed from a rack at the other side of the cage by means of the conveyor 20. As will be seen from FIG. 5, the conveyors fit between the sides of the rack and when a full load of blocks has filled the conveyor down to the limit switch 108, the conveyor stops and the rack is raised to pick up the pallets, the ledges 103 supporting the outer edges of the pallets. When the near rack has been loaded and the other rack unloaded the near rack will be at an elevated position in the cage and the other rack will be empty and will have been lowered to rest upon the crossover conveyor 80 in the pit 12. With the parts in this position the cage is then moved from the full-line position of FIG. 1 to the broken-line position thereof. The filled rack of blocks is then lowered to rest upon the beams 113 and 114. When the cage is in the broken-line position of FIG. 1, the conveyor 80 is started to move an empty rack from one side of the pit to the other so that later it can be picked up by the two arms 54 at the near side of the cage when the cage returns to its original position. A rack filled with semicured blocks which must be unloaded (or an empty rack) may have previously been placed over the table 112. After the empty rack has been moved across the pit on conveyor 80, the arms 54 on the near side of the cage as viewed in FIG. 1 are lowered to lie in a plane beneath the cross conveyor 80 while the arms at the far side of the cage are raised to pick up the rack from the table 112. The cage then returns to its original position and the arms at the near side are raised to pick up the empty rack. Loading of this rack may then commence and this is carried out as previously outlined.

It is contemplated that any suitable electric and hydraulic control and operating means can be used to operate the machine, and, since such means can be readily worked out by those skilled in the art, no details of such means have been shown.

I claim:

1. In a machine for handling concrete blocks or the like as the same are discharged from a machine for making the same, comprising a cage mounted for limited horizontal movement from a first position to a second position, means for moving said cage from said first position to said second position and return, a vertically movable first rack support means in said cage for supporting a first rack designed to hold concrete blocks, a vertically movable second rack support means in said cage for supporting a second rack designed to hold concrete blocks laterally adjacent said first rack, a first powered means for operating said first rack support means, a second powered means for operating said second rack support means, and rack transfer means for moving a rack deposited by one of said rack support means thereon when said cage is in one of its two positions to a position in the path of movement of the other of said rack support means.

2. In a machine for handling concrete blocks or the like as the same are discharged from a machine for making the same, comprising a cage mounted for limited horizontal movement from a first position to a second position, means for moving said cage from said first position to said second position and return, a first vertically movable rack support means in said cage for supporting a first rack designed to hold concrete blocks, a second vertically movable rack support means in said cage for supporting a second rack designed to hold concrete blocks laterally adjacent said first rack, a first powered means for operating said first rack support means, a second powered means for operating said second rack support means, rack transfer means for moving a rack deposited by one of said rack support means thereon when said cage is in one of its two positions to a position in the path of movement of the other of said rack support means, and a stationary rack support for a rack carried by each of said movable rack supports located in the paths of movement of the racks, respectively, carried on said rack supports when said cage is in the other of its two positions.

3. In a machine for handling concrete blocks, a cage mounted for limited horizontal movement from a first position to a second position, a pair of vertically movable, powered, rack support means carried by the cage for independently supporting and moving a pair of racks within the cage in parallel relation, and a rack transfer means extending transversely of the direction of movement of the cage for supporting and moving a rack deposited by one of said rack support means in one position of said cage to a position where said rack can be picked up by the other of said rack support means in the same position of said cage.

4. The apparatus set forth in claim 3 in which conveyor means is provided in alignment with a rack supported on one of said rack support means for conveying blocks on pallets into the rack.

5. In apparatus for use in conjunction with a conveyor feeding articles, a cage in the path of said conveyor, said cage being movable horizontally from a first position adjacent the discharge end of the conveyor to a second position removed therefrom, a powered vertically movable first rack support means in the cage for supporting a rack in position to receive the articles from the conveyor, a powered vertically movable second rack support means in the cage for supporting a rack laterally of a rack on said first rack support means, stationary rack support means located at the second position of said cage and in the path of movement of racks on the respective movable support means when said cage is in said second position, and a rack transfer means located in the first position of said cage operable to move a rack from the path of movement of said second movable rack support means into the path of movement of said first rack support means.

6. The apparatus set forth in claim 5 in which said cage extends above and below the level of the stationary support means and in which said rack transfer means is located below said stationary support means.

7. The apparatus set forth in claim 5 in which a second conveyor is positioned and operable to remove articles from a rack on said second movable rack support means when said cage is in said first position.

8. In apparatus for use in conjunction with a conveyor feeding articles resting on pallets, a foundation means including an area at a given ground level and an open-top pit, a cage mounted on said foundation extending above ground level and extending into said pit, said cage being movable from a first position at one end of said pit to a second position at the other end of said pit, power means for moving said cage, a powered vertically movable first rack support means in the cage for supporting a rack, a powered vertically movable second rack support means in said cage for supporting a rack laterally of a rack supported on said first rack support means, a first stationary rack support at ground level over said pit at said other end thereof in the path of movement of a rack carried by said first rack support means, a second stationary rack support at ground level over said pit at said other end thereof in the path of movement of a rack carried by said second rack support means, and a rack transfer means in said pit at said one end thereof operable to move a rack from the path of movement of said second movable rack support means into the path of movement of said first rack support means.

References Cited
UNITED STATES PATENTS

| 2,139,182 | 12/1938 | Bledsoe | 214—16 |
| 2,605,004 | 7/1952 | Grueneberg. | |
| 2,787,386 | 4/1957 | Peterson | 214—392 |
| 2,911,115 | 11/1959 | Jacobsen | 214—16.1 |
| 3,161,309 | 12/1964 | Baudhuin | 214—392 |

FOREIGN PATENTS

| 132,812 | 5/1949 | Australia. |

GERALD M. FORLENZA, *Primary Examiner.*